United States Patent [19]
Ideta

[11] Patent Number: 4,618,036
[45] Date of Patent: Oct. 21, 1986

[54] HYDRAULIC CONTROL SYSTEM FOR LOCK-UP CLUTCH OF TORQUE CONVERTER

[75] Inventor: Yasufumi Ideta, Sagamihara, Japan

[73] Assignee: Nissan Motor Co., Ltd., Yokohama, Japan

[21] Appl. No.: 641,586

[22] Filed: Aug. 17, 1984

[30] Foreign Application Priority Data

Oct. 14, 1983 [JP] Japan .................. 58-190879

[51] Int. Cl.⁴ ............................................. F16D 47/06
[52] U.S. Cl. .................................................... 192/3.3
[58] Field of Search ...................... 192/3.31, 3.3, 3.29, 192/3.28, 103 R, 3.57; 74/732, 731, 645

[56] References Cited

U.S. PATENT DOCUMENTS 3,966,032 6/1976 Koivunen ............... 192/3.31 X
3,977,502 8/1976 Chana ..................... 192/3.31 X
4,271,939 6/1981 Iwanaga et al. ............... 192/3.3
4,382,496 5/1983 Yamamori .

*Primary Examiner*—George H. Krizmanich
*Attorney, Agent, or Firm*—Schwartz, Jeffery, Schwaab, Mack, Blumenthal & Evans

[57] ABSTRACT

A hydraulic control system comprises a pump driven by an engine to discharge hydraulic fluid, a torque converter having a lock-up clutch with a lock-up clutch piston movable to a clutch released position when fluid pressure within a lock-up release chamber is higher than fluid pressure within a working chamber within a torque converter cavity, a line pressure regulator valve and an orifice which provides a restricted flow communication between the torque converter and the pump even when line pressure generated by the line pressure regulator valve is lower than a predetermined value.

5 Claims, 2 Drawing Figures

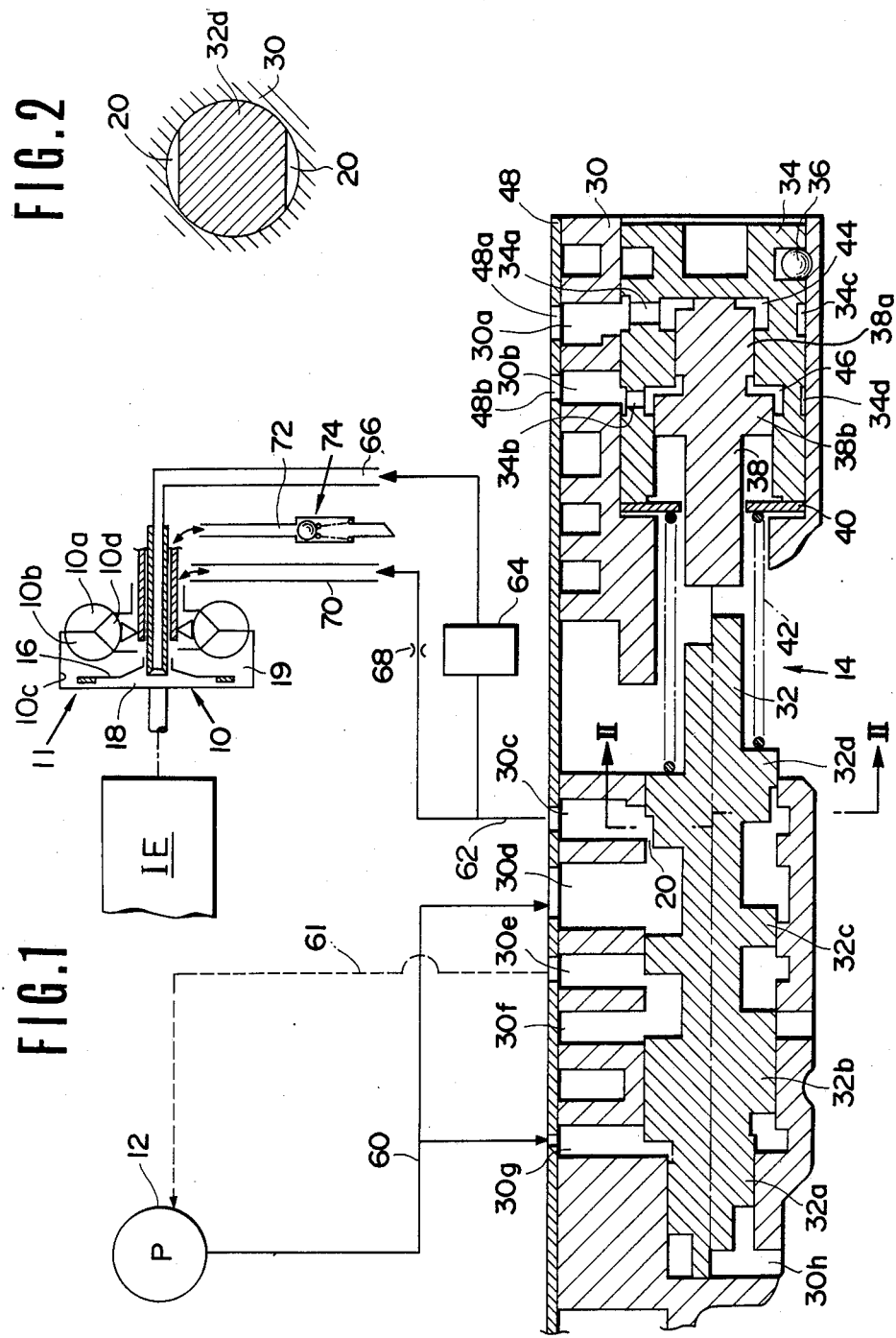

HYDRAULIC CONTROL SYSTEM FOR LOCK-UP CLUTCH OF TORQUE CONVERTER

BACKGROUND OF THE INVENTION

The present invention relates to a hydraulic control system for an automatic transmission.

U.S. Pat. No. 4,271,939 discloses a hydraulic control system for an automatic transmission provided with a lock-up clutch. The lock-up clutch is disposed within a torque converter and functions to mechanically connect in impeller with a turbine. In detail, there is arranged within the torque converter a lock-up clutch piston which defines a lock-up release chamber. When the lock-up clutch piston assumes a clutch engaged position, the impeller is mechanically connected with the turbine, whereas when it assumes a clutch released position, the impeller is mechanically disconnected from the turbine, thus allowing the torque converter to assume a torque converter state. The lock-up clutch piston is biased to the clutch engaged position by actuating pressure within a converter chamber of the torque converter (i.e., the actuating pressure being created within the working chamber owing to hydraulic power transmission by the impeller, turbine and stator) when oil is discharged from the lock-up release chamber. When the oil pressure is applied to the lock-up release chamber, the lock-up clutch piston is moved against the actuating pressure in the working chamber of the torque converter until the clutch released position. The lock-up chamber and the working chamber of the torque converter are supplied with oil from the same oil conduit. But, since oil is supplied via an orifice to the working chamber of the torque converter and oil is discharged therefrom at a constant rate, the oil pressure within the lock-up release chamber is kept slightly higher than that in the working chamber of the torque converter, thus ensuring release of the lock-up clutch. The oil pressure within the working chamber of the torque converter is supplied from a line pressure regulator valve. Viz., when the line pressure regulator valve has reached an equilibrium state thereof and the line pressure has increased beyond a predetermined value, a port connected with an oil conduit communicating with the working chamber of the torque converter is opened, admitting discharged oil to the working chamber of the torque converter. When the amount of discharged oil via this port is not enough to regulate the line pressure, the oil is discharged also through a drain port of the line pressure regulator valve. A hydraulic control system for an automatic transmission including the above mentioned line pressure regulator valve presents the following problem. Since the line pressure regulator valve admits a superabundant amount of oil to the torque converter only when the line pressure has reached the predetermined value as described above, when the line pressure is lower than the predetermined value and thus the amount of discharged oil is not sufficient, the oil hardly flows into the working chamber of the torque converter, thus creating no difference in pressure between oil pressure in the working chamber and that in the lock-up chamber. This causes the lock-up clutch to remain in a slightly engaged state against a demand that the lock-up clutch be released. When the vehicle moves off from a standstill, the line pressure regulator valve cannot discharge enough flow of oil toward the torque converter because an oil pump driven by an engine rotates at low speeds. If the lock-up clutch is slightly engaged when the vehicle is to move off from a standstill, the vehicle cannot start smoothly and with sufficient acceleration. One measure to solve this problem is to use an oil pump having a large capacity. But this presents a problem of how to find an installation space because of its large size. Another problem is that a loss in torque loss for driving the oil pump is large.

SUMMARY OF THE INVENTION

An object of the present invention is to provide a hydraulic control system for an automatic transmission wherein release of a lock-up clutch is ensured even when the discharge flow rate of fluid by a pump is low.

According to the present invention, a hydraulic control system comprises a pump driven by an engine to discharge hydraulic fluid, a torque converter having a lock-up clutch with a lock-up clutch piston movable to a clutch released position when fluid pressure within a lock-up release chamber is higher than fluid pressure within a working chamber within a torque converter cavity, a line pressure regulator valve and an orifice which provides a restricted flow communication between the torque converter and the pump even when line pressure generated by the line pressure regulator valve is lower than a predetermined value.

BRIEF DESCRIPTION OF THE DRAWINGS

FIG. 1 is a schematic view of a hydraulic control system for an automatic transmission according to the present invention; and FIG. 2 is a section through line II—II of FIG. 1.

DETAILED DESCRIPTION OF THE PREFERRED EMBODIMENT

Referring to FIGS. 1 and 2, a preferred embodiment of a hydraulic control system for an automatic transmission according to the present invention is described. This hydraulic control system comprises a torque converter 10 having a lock-up clutch 11, an oil pump 12 driven by an internal combustion engine IE, and a line pressure regulator valve 14. The torque converter 10 includes an impeller 10a and a turbine 10b which are disposed in a torque converter cavity 10c. A stator 10d is situated between the impeller 10a and the turbine 10b. The lock-up clutch 11 has a lock-up clutch piston disposed within the torque converter cavity 10c to divide same into a lock-up release chamber 18 and a working chamber 19 in which the impeller 10a, turbine 10b and stator 10d are disposed.

The line pressure regulator valve 14 has a valve body 30 formed with a bore having a closed end. Situated within the bore near the closed end of the bore is a first spool 32. A sleeve 34 is disposed within the bore near an open end thereof and a second spool 38 is within the sleeve 34. The sleeve 34 is fixed to the valve body 30 by means of a pin 36. The bore includes a small diameter section in which the first spool 32 is disposed and a large diameter section in which the sleeve 34 is disposed. The large diameter section is connected to the small diameter section via a shoulder. Between the shoulder and the adjacent end of the sleeve 34 is held a retaining plate 40. A spring 42 is operatively disposed between the retaining plate 40 and the first spool 32. The second spool 38 includes a small diameter land 38a and a large diameter land 38b spaced axially from each other. The small diameter land 38a is disposed in a small diameter bore of the sleeve 34 and defines a chamber 44, while the larger diameter land 38b is disposed in a large diameter bore of the sleeve 34 and defines between it and the small diameter land 38a a chamber 46. The oil chambers 44 and 46, serving as line pressure boost chambers, are supplied with signal oil pressures, respectively, via predetermined oil conduits, depending upon the operating condition which may be represented by a combination of two of a throttle opening degree, a vehicle speed and a drive range. The signal oil pressures, therefore, may include a throttle pressure, a governor pressure, and a drive range indicative pressure. The fluid connection to the oil chamber 44 is established by a radial bore 34a formed through a sleeve 34, a circumferential groove 34c formed around the sleeve 34, a radial bore 30a formed through the valve body 30 and a hole 48a formed through a separate plate 48. Similarly, the fluid connection to the oil chamber 46 is established by a radial bore 34b, formed through the sleeve 34, a circumferential groove 34d formed around the sleeve 34, a radial bore 30b formed through the valve body 30, and a hole 48b formed through the separate plate 48.

The first spool 32 has four axially spaced lands 32a, 32b, 32c, and 32d, while, the valve body 30 is formed with six ports 30c, 30d, 30e, 30f, 30g and 30h. Among the ports, the ports 30f and 30h are drain ports. The ports 30d and 30g are connected to a line pressure oil conduit 60 that is supplied with discharge pressure from an oil pump 12. The port 30e is connected via an oil conduit 61, with a control cylinder, not shown, which functions to control discharge capacity of the oil pump 12.

For effecting oil supply to the lock-up release chamber 18 and the working chamber 19, the port 30c is connected with an oil conduit 62. The oil conduit 62 is communicable via a lock-up control valve 64 with an oil conduit 66 that communicates with the lock-up release chamber 18. The lock-up control valve 64 serves as a switch valve which allows communication of the oil conduit 66 with the oil conduit 62 under a predetermined condition. The oil conduit 62 is connected via an orifice 68 with an oil conduit 70. The oil conduit 70 is connected with the working chamber 19 within the torque converter. Oil is discharged from the working chamber 19 via an oil conduit 72 and a check valve 74.

For establishing a restricted flow communication between the oil conduit 62 and the oil pump 12, the first land 32d of the first spool 32 is formed with cutouts 20 as shown in FIGS. 1 and 2. The cutouts 20 extend from a lefthand end of the land 32d inwardly by such an axial length that the fluid communication between the ports 30d and 30c is established via the cutouts 20 when the spool 32 is pressed by the spring 42 to assume the illustrated upper half position thereof. The combined effective flow cross sectional area of the cutouts 20 is small enough to provide an orifice effect when the spool 32 assumes the illustrated upper half position thereof.

The operation is hereinafter described. In the case where the oil pump 12 discharges oil at a sufficiently high flow rate, the first spool 32 assumes an equilibrium state wherein a rightward direction force, as viewed in FIG. 1, due to oil pressure (line pressure) in the port 30g acting upon a difference in area between the lands 32a and 32b balances with a combined leftward directed force resulting from a combination of a force due to the spring 42 and a force by the second spool 38 by controlling discharge of oil from the port 30d to the port 30c and the port 30f, thus effecting a well known pressure regulation of the line pressure in the oil conduit 60. The oil discharged to the port 30c is supplied, as an actuating pressure, to the working chamber 19 within the torque converter via the oil conduit 62, orifice 68, and oil conduit 70 and then the oil is discharged from the working chamber 19 via the oil conduit 72, and check valve 74. As a result, the working chamber 19 is kept pressurized. When the lock-up control valve 64 establishes a fluid communication between the oil conduits 62 and 66, the oil pressure within the oil conduit 62 acts in the lock-up release chamber 18, too. Although the oil within the working chamber 19 and that within the lock-up release chamber 18 are supplied from the same oil conduit 62, the oil pressure within the lock-up release chamber 18 is kept higher than that within the working chamber 19 because the oil pressure is supplied to the oil conduit 70 via an orifice 68 to cause a slight drop in oil pressure. Owing to this pressure difference across the lock-up clutch piston 16, the lock-up clutch piston 16 is subjected to a rightward directed force as viewed in FIG. 1 and thus the lock-up clutch is released. When the lock-up control valve 64 switches to disconnect the oil conduit 66 from the oil conduit 62 and connects same to a drain, the oil is discharged from the lock-up release chamber 18 and thus the lock-up clutch piston 16 is subjected to a leftward directed force, as viewed in FIG. 1, due to the oil pressure in the working chamber 19, allowing the lock-up clutch to be engaged.

The operation in the case where the oil pump 12 cannot discharge oil at a sufficiently high flow rate is now described. The discharge rate of oil by the oil pump 12 is small at low engine speeds when the vehicle moves off from a standstill. Under this condition, since the line pressure in the oil conduit 60 is now sufficiently high so that the spool 32 of the line pressure regulator valve 14 cannot assume its equilibrium state yet and thus remains in the illustrated upper half portion thereof as viewed in FIG. 1. In this position of the spool 32, the port 30d is allowed to communicate with the port 30c via the cutouts 20 only. This ensures introduction of oil into the port 30c via the cutouts 20 at a predetermined flow rate even if the discharge flow rate of oil from the oil pump 12 is not sufficiently high. The oil in the port 30c is supplied to the working chamber 19 via the oil conduit 62, orifice 68 and oil conduit 70. Since the lock-up control valve 64 connects the oil conduit 66 to the oil conduit 62 when the vehicle moves off from standstill, the oil in the port 30c is supplied to the lock-up release chamber 18 also via the oil conduit 62, lock-up control valve 64 and oil conduit 66. Thus, the lock-up clutch is kept released, ensuring the smooth starting of the vehicle owing to the torque multiplication function of the torque converter.

In order to prevent a lack in supply of oil to the clutch and brake unit when the oil pump 12 cannot discharge oil at sufficiently high flow rate, the effective flow cross sectional area of the cutouts 20 has to be set small enough to provide an orifice effect and secure a sufficient minimal amount of oil for keeping the lock-up clutch released. Although in the previously described embodiment, the orifice effect is provided by the cutouts 20 in the land 32 of the first spool 32, the orifice effect may be produced by decreasing the size of a hole formed through the separate plate 48 opening to the port 30c or narrowing the oil conduit 62.

As will now be appreciated, according to the present invention, smooth and quick starting of a vehicle is ensured because fluid supply to a lock-up release chamber is effected in a flow restricted manner even when the line pressure regulator valve cannot assume its equilibrium state and the line pressure is lower than a predetermined value at which the line pressure regulator valve assumes the equilibrium state.

What is claimed is:

1. A hydraulic control system for an automatic transmission of an automotive vehicle having an engine, comprising:

a pump driven by the engine to discharge hydraulic fluid;

a torque converter including a torque converter cavity, an impeller, and a turbine which are disposed in said torque converter cavity, the torque converter including a lock-up clutch which has a lock-up clutch piston movably disposed within said torque converter cavity to divide same into a lock-up release chamber and a working chamber in which said impeller and said turbine are disposed;

a line pressure regulator valve connected to said pump to regulate the hydraulic fluid discharged by said pump and generate a line pressure, said line pressure regulator valve having a port, said line pressure regulator valve including means for establishing a fluid communication path between said port and said pump when said line pressure is higher than a predetermined value to allow a portion of the hydraulic fluid discharged by said oil pump to flow to said port;

means communicating with said port for effecting fluid supply to said lock-up release chamber and said working chamber; and means for establishing a restricted flow communication path between said port and said pump when said line pressure is less than said predetermined value.

2. A hydraulic control system as claimed in claim 1, wherein said line pressure regulator valve includes a spool having a land cooperating with said port, said restricted flow communication establishing means includes a cutout formed on said land of said spool.

3. A hydraulic control system as claimed in claim 1, wherein said lock-up clutch piston assumes a clutch engaged position when fluid pressure within said working chamber is higher than fluid pressure within said lock-up release chamber, and said lock-up clutch piston assumes a clutch released position when fluid pressure within said lock-up release chamber is higher than fluid pressure within said working chamber.

4. A hydraulic control system for an automatic transmission of an automotive vehicle having an engine, comprising:

a pump driven by the engine to discharge hydraulic fluid;

a torque converter including a torque converter cavity, an impeller, and a turbine which are disposed in said torque converter cavity, the torque converter including a lock-up clutch which has a lock-up clutch piston movably disposed within said torque converter cavity to divide same into a lock-up release chamber and a working chamber in which said impeller and said turbine are disposed;

a line pressure regulator valve having an input port connected to said pump to receive the hydraulic fluid discharged by said pump and an output port connected to said lock-up release chamber and said working chamber of said torque converter, said line pressure regulator valve including means for regulating the hydraulic fluid discharged by said pump by selectively establishing a fluid flow communication path between said input port and said output port when the pressure of the hydraulic fluid discharged by said pump exceeds a predetermined value, said line pressure regulator valve also including means for providing a restricted flow communication path between said inlet port and said outlet port when the pressure of the hydraulic fluid discharged by said pump fails to exceed said predetermined value.

5. A hydraulic control system as claimed in claim 4, wherein said regulating means of said line pressure regulator valve includes a spool having a land cooperating with said outlet port, and said restricted flow communication establishing means includes a cutout formed on said land of said spool.

* * * * *